(12) United States Patent
Kwon et al.

(10) Patent No.: US 8,980,462 B2
(45) Date of Patent: *Mar. 17, 2015

(54) CABLE-TYPE SECONDARY BATTERY AND METHOD FOR MANUFACTURING THE SAME

(75) Inventors: Yo-Han Kwon, Daejeon (KR); Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,347

(22) Filed: Oct. 20, 2011

(65) Prior Publication Data

US 2012/0100415 A1 Apr. 26, 2012

(30) Foreign Application Priority Data

Oct. 21, 2010 (KR) .................... 10-2010-0102968

(51) Int. Cl.
*H01M 2/02* (2006.01)
*H01M 4/583* (2010.01)
(Continued)

(52) U.S. Cl.
CPC ............ *H01M 10/0436* (2013.01); *H01M 4/70* (2013.01); *H01M 4/74* (2013.01);
(Continued)

(58) Field of Classification Search
CPC .......... H01M 4/70; H01M 4/74; H01M 4/75; H01M 4/765; H01M 10/0583; H01M 10/0431
USPC .................................. 429/163, 127; 29/623.1
See application file for complete search history.

(56) References Cited

U.S. PATENT DOCUMENTS 4,307,161 A * 12/1981 Brown .......................... 429/120
5,470,357 A * 11/1995 Schmutz et al. ............. 29/623.5
(Continued)

FOREIGN PATENT DOCUMENTS

JP       08-088019 A      4/1996
JP       2001-110445 A    4/2001
(Continued)

OTHER PUBLICATIONS

Machine English Translation of JP 08-088019 to Nishikawa.*
(Continued)

*Primary Examiner* — Milton I Cano
*Assistant Examiner* — Michael Dignan
(74) *Attorney, Agent, or Firm* — Lerner, David, Littenberg, Krumholz & Mentlik, LLP

(57) ABSTRACT

A cable-type secondary battery includes an electrode assembly, which has a first polarity current collector having a long and thin shape, at least two first polarity electrode active material layers formed on the first polarity current collector to be spaced apart in the longitudinal direction, an electrolyte layer filled to surround at least two first polarity electrode active material layers, at least two second polarity electrode active material layers formed on the electrolyte layer to be spaced apart at positions corresponding to the first polarity electrode active material layers, the electrode assembly being continuously bent into a serpentine configuration by a space between the first polarity electrode active material layers; a second polarity current collector configured to surround at least one side of the electrode assembly bent into a serpentine configuration; and a cover member configured to surround the second polarity current collector and the electrode assembly.

13 Claims, 1 Drawing Sheet

(51) Int. Cl.
| | |
|---|---|
| *H01M 4/485* | (2010.01) |
| *H01M 4/38* | (2006.01) |
| *H01M 4/40* | (2006.01) |
| *H01M 4/44* | (2006.01) |
| *H01M 4/46* | (2006.01) |
| *H01M 4/48* | (2010.01) |
| *H01M 4/52* | (2010.01) |
| *H01M 4/525* | (2010.01) |
| *H01M 4/505* | (2010.01) |
| *H01M 4/66* | (2006.01) |
| *H01M 4/70* | (2006.01) |
| *H01M 4/74* | (2006.01) |
| *H01M 4/75* | (2006.01) |
| *H01M 4/76* | (2006.01) |
| *H01M 10/052* | (2010.01) |
| *H01M 10/0583* | (2010.01) |
| *H01M 4/94* | (2006.01) |
| *H01M 10/0565* | (2010.01) |
| *H01M 10/04* | (2006.01) |

(52) U.S. Cl.
CPC ............... *H01M 4/75* (2013.01); *H01M 4/765* (2013.01); *H01M 10/0431* (2013.01); *H01M 10/052* (2013.01); *H01M 10/0583* (2013.01); *Y02E 60/122* (2013.01)
USPC ........................... 429/163; 29/623.1; 429/127

(56) References Cited

U.S. PATENT DOCUMENTS

| | | | |
|---|---|---|---|
| 6,461,762 B1 * | 10/2002 | Yang et al. | 429/127 |
| 2003/0059526 A1 | 3/2003 | Benson et al. | |
| 2005/0147857 A1 | 7/2005 | Crumm et al. | |
| 2010/0203372 A1 | 8/2010 | Kim et al. | |
| 2012/0100408 A1 * | 4/2012 | Kwon et al. | 429/127 |

FOREIGN PATENT DOCUMENTS

| | | | |
|---|---|---|---|
| JP | 2002-042855 | 2/2002 | |
| JP | 2002-157997 | 5/2002 | |
| JP | 2002-329495 A | 11/2002 | |
| JP | 2003-308852 A | 10/2003 | |
| KR | 20070009231 A | 1/2007 | |
| KR | 20070075928 A | 7/2007 | |
| KR | 2010-0098227 A | 9/2010 | |
| TW | 472425 B | 1/2002 | |
| WO | WO2005098994 * | 10/2005 | H01M 2/10 |
| WO | 2006077192 A1 | 7/2006 | |
| WO | 2009014299 A1 | 1/2009 | |

OTHER PUBLICATIONS

Machine English Translation of JP 08-088019 to Nishikawa originally published 1996.*
U.S. Appl. No. 13/275,691, published 2012.
U.S. Appl. No. 13/277,340, published 2012.

* cited by examiner

CABLE-TYPE SECONDARY BATTERY AND METHOD FOR MANUFACTURING THE SAME

CROSS-REFERENCE TO RELATED APPLICATION

This application claims priority under 35 USC 119(a) to Korean Patent Application No. 10-2010-0102968 filed in the Republic of Korea on Oct. 21, 2010, the entire contents of which are incorporated herein by reference.

BACKGROUND OF THE DISCLOSURE

1. Field of the Disclosure

The present disclosure relates to a cable-type secondary battery, which can freely change in shape, and a method for manufacturing the same.

2. Description of the Related Art

Recently, the development of wireless communication technology has contributed to the popularization of mobile devices. In response to the development of wireless communication technology, secondary batteries are essentially used as a power supply for mobile devices. Meanwhile, electric vehicles, hybrid vehicles, and the like have been developed for the purpose of preventing environmental pollution, and these vehicles are also powered by secondary batteries.

As such, the use of secondary batteries has been increasing in various industrial fields, and their output, capacity, and structure are diversifying according to the characteristics of the industrial field the secondary batteries are used in.

Generally, a secondary battery comprises an electrode assembly including an anode and a cathode, which are formed by applying active materials on both sides of a plate-shaped current collector, and a separator interposed between the anode and the cathode. The electrode assembly is received in a cylindrical or prismatic metal can or in a pouch-type case made of an aluminum laminate sheet together with a liquid electrolyte or a solid electrolyte. Moreover, the electrode assembly may have a structure, in which a plurality of jelly-roll type or thin plate-like unit electrodes each including sheet-like anode/separator/cathode are sequentially stacked, so as to increase the capacity of the secondary battery. Therefore, the electrodes (such as anode and cathode) of the electrode assembly essentially have a plate shape.

This conventional plate-shaped electrode structure has an advantage of achieving a high degree of integration during winding or stacking of the electrode assembly. However, depending on the necessity of the industrial field, it is very difficult to modify the structure of the plate-shaped electrode. Moreover, the plate-shaped electrode structure is sensitive to changes in the volume of electrodes during charging and discharging cycles. Furthermore, the gas generated in the cells is not easily discharged to the outside, which can result in problems such as high potential difference between the electrodes and the like.

In particular, to meet the various needs of the consumers, the types of devices using secondary batteries are diversifying and the design of the devices are becoming very important. However, the creation of a separate area or room, in which secondary batteries having a conventional structure and/or shape (such as cylindrical, prismatic, or pouch type) is mounted, in such special types of devices can be a significant obstacle to the expansion of wireless technology or to the introduction of new designs. For example, when a newly developed device has a long and narrow space in which a secondary battery is mounted, it is essentially impossible or ineffective to modify the structure of the secondary battery including an electrode assembly using plate-shaped electrodes as a basis and to mount the secondary battery in the device. That is, since the conventional cylindrical, coin-type, and prismatic batteries are formed to have specific shapes, they cannot freely change in shape and are limited in use. Moreover, they have a problem of not being able to bend or twist to meet their intended use.

In order to solve the above problems, the present applicant discloses "an electrode assembly of a novel structure and a secondary battery comprising the same" (filed on Jan. 17, 2006 and registered on Feb. 12, 2008 as Korean Patent No. 10-0804411), the entire contents of which are incorporated herein by reference.

However, such a secondary battery (hereinafter, referred to as a "cable-type secondary battery") has insufficient flexibility. Moreover, in the case the cable-type secondary battery is excessively deformed by the application of an external force, the active materials may separate.

SUMMARY OF THE DISCLOSURE

The present disclosure is designed to solve the problems of the prior art, and therefore it is an object of the present disclosure to provide a secondary battery with an improved structure which can easily change in shape and can obtain excellent stability and performance.

In order to achieve the objects, the present disclosure provides a cable-type secondary battery including: an electrode assembly, which includes a first polarity current collector having a long and thin shape, whose cross-section perpendicular to the longitudinal direction is circular, asymmetrical oval, or polygonal, at least two first polarity electrode active material layers formed on an outer surface of the first polarity current collector to be spaced apart from each other at a predetermined interval in the longitudinal direction, an electrolyte layer filled to surround at least two first polarity electrode active material layers, and at least two second polarity electrode active material layers formed on an outer surface of the electrolyte layer to be spaced apart from each other at a predetermined interval at positions corresponding to the first polarity electrode active material layers, the electrode assembly being continuously bent into a substantially shape by a space formed by the predetermined interval between the first polarity electrode active material layers; a second polarity current collector configured to surround at least one of both sides of the electrode assembly which is bent into a substantially "S" shape; and a cover member configured to surround the second polarity current collector and the electrode assembly.

Here, the current collector may be made of: stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; or a conductive polymer. The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc.

The first polarity electrode active material may include natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); and a complex of the metal (Me) and carbon. The second polarity electrode active material may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x<0.5$, $0 \leq y<0.5$, $0 \leq z<0.5$, and $x+y+z \leq 1$).

The electrolyte layer may be made of a gel-type polymer electrolyte using PEO, PVdF, PMMA, PAN or PVAC, or a solid electrolyte using PEO, polypropylene oxide (PPO), polyethyleneimine (PEI), polyethylene sulfide (PES) or polyvinyl acetate (PVAc).

In the cable-type secondary battery, the electrolyte layer may further include a lithium salt. The lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The first polarity may be a cathode, and the second polarity may be an anode.

In order to accomplish the above objects, the present disclosure also provides a method for manufacturing a cable-type secondary battery, the method including: (a) preparing a first polarity current collector in the form of a long and thin wire, whose cross-section perpendicular to the longitudinal direction is circular, asymmetrical oval, or polygonal; (b) forming at least two first polarity electrode active material layers on an outer surface of the first polarity current collector to be spaced apart from each other at a predetermined interval in the longitudinal direction; (c) forming an electrolyte layer to surround at least two first polarity electrode active material layers; (d) forming at least two second polarity electrode active material layers on an outer surface of the electrolyte layer to be spaced apart from each other at a predetermined interval at positions corresponding to the first polarity electrode active material layers; (e) forming an electrode assembly by continuously bending the resulting product into a substantially "S" shape with respect to a space formed by the predetermined interval between the first polarity electrode active material layers; (f) surrounding at least one of both sides of the electrode assembly with a second polarity current collector; and (g) surrounding the second polarity current collector and the electrode assembly with a cover member.

Effects of the Disclosure

The cable-type secondary battery according to the present disclosure including an electrode assembly with a continuous "S" shape, in which active material layers form a pattern, has a region in which the active material layer is not formed. This region has higher flexibility, and thus the overall flexibility of the cable-type secondary battery is improved. Moreover, when an excessive external force is applied to the cable-type secondary battery of the present disclosure, the region in which the active material layer is not formed is first deformed without deforming a region in which the active material layers are formed, and thus the active material layers are less deformed. Therefore, it is possible to prevent the active material layers from separating. Moreover, with the use of a sheet-like current collector, the manufacturing of the cable-type secondary battery is facilitated.

The cable-type secondary battery of the present disclosure is suitable for the power supply of mobile devices in the form of a wrist watch.

BRIEF DESCRIPTION OF THE DRAWINGS

Other objects and aspects of the present disclosure will become apparent from the following descriptions of the embodiments with reference to the accompanying drawings in which.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
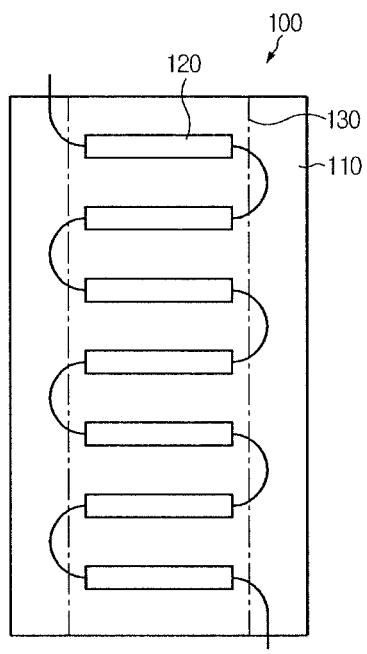
FIG. 1 is a cross-sectional view showing a cable-type secondary battery in accordance with a preferred embodiment of the present disclosure.
Figure 2:
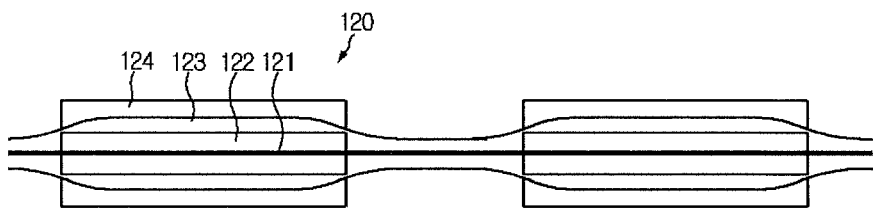
FIG. 2 is a cross-sectional view showing a cable-type secondary battery in accordance with a preferred embodiment of the present disclosure.

FIGS. 1 and 2 schematically show a cable-type secondary battery in accordance with a preferred embodiment of the present disclosure. In the figures, the same reference numerals denote the same or similar elements.

Referring to FIGS. 1 and 2, a cable-type secondary battery 100 of the present disclosure includes an electrode assembly 120, which includes a first polarity current collector 121 having a long and thin shape, whose cross-section perpendicular to the longitudinal direction is circular, asymmetrical oval, or polygonal, at least two first polarity electrode active material layers 122 formed on an outer surface of the first polarity current collector 121 to be spaced apart from each other at a predetermined interval in the longitudinal direction, an electrolyte layer 123 filled to surround at least two first polarity electrode active material layers 122, and at least two second polarity electrode active material layers 124 formed on an outer surface of the electrolyte layer 123 to be spaced apart from each other at a predetermined interval at positions corresponding to the first polarity electrode active material layers 122, the electrode assembly 120 being continuously bent into a substantially "S" shape by a space formed by the predetermined interval between the first polarity electrode active material layers 122; a second polarity current collector 130 in the form of a sheet configured to surround at least one of both sides of the electrode assembly 120 which is continuously bent into a substantially "S" shape by the space formed by the predetermined interval between the first polarity electrode active material layers 122; and a cover member 110 configured to surround the second polarity current collector 130 and the electrode assembly 120.

The cable-type secondary battery of the present disclosure has a linear structure, which extends in the longitudinal direction, and flexibility, and thus can freely change in shape. Here, the term "substantially" used herein means that any "S" shape is possible even if it is not a perfect "S" shape, as long as it has been changed enough to achieve the objects of the present disclosure.

Each of the electrode active material layers 122 and 124 of the present disclosure includes an electrode active material, a binder, and a conductive material and is coupled to the current collector to form an electrode. When the electrode is deformed such as being folded or being severely bent by an external force, the electrode active material may separate from the electrode active material layer, thereby reducing the performance and capacity of the battery. However, the cable-type secondary battery of the present disclosure has the first polarity electrode active material layers 122 and the second polarity electrode active material layers 124 each having a pattern. Therefore, when an excessive external force is applied to the cable-type secondary battery of the present disclosure, the uncoated region in which the electrode active material layer is not formed is first deformed without deforming the region where the electrode active material layers 122 and 124 are formed. This is because the uncoated region has higher flexibility than the region where the electrode active material layers are formed, and thus the deformation first occurs in the uncoated region even when the same force is applied. Therefore, the first polarity electrode active material layers 122 and the second polarity electrode active material layers 124 of the present disclosure are less deformed, and thus it is possible to prevent the separation of the electrode active materials.

Also, since the uncoated region in which the electrode active material layer is not formed has excellent flexibility, the overall flexibility of the cable-type secondary battery can be improved. The electrode assembly 120 of the present disclosure has a continuous "S" shape formed by bending the uncoated region corresponding to the space formed by the predetermined interval between the first polarity electrode active material layers.

The electrode active material layers 122 and 124 of the present disclosure allow ions to move through the current collectors 121 and 130, and the movement of ions is caused by the interaction of ions such as intercalation/deintercalation of ions into and from the electrolyte layer 123.

The second polarity current collector 130 of the present disclosure is preferably in the form of a sheet. The second polarity current collector 130 in the form of a sheet is configured to surround at least one of both sides of the electrode assembly 120, which facilitates the formation of the second polarity current collector 130 compared to the case where the second polarity current collector 130 is formed directly on the second polarity electrode active material layers.

The current collectors 121 and 130 are preferably made of stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer surface-treated with a conductive material or a conductive polymer, the current collector has a higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the type of the non-conductive polymer used for the current collector is not particularly limited.

The first polarity may be a cathode, and the second polarity may be an anode.

Non-limiting examples of materials for the cathode active material layer may include natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); and a complex of the metal (Me) and carbon.

Non-limiting examples of materials for the anode active material layer may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x < 0.5$, $0 \leq y < 0.5$, $0 \leq z < 0.5$, and $x+y+z \leq 1$).

In the cable-type secondary battery of the present disclosure, the electrolyte layer 123 is filled to surround the first polarity electrode active material layers. Preferably, the electrolyte layer constituting a pathway for ions may be made of a gel-type polymer electrolyte using PEO, PVdF, PMMA, PAN or PVAC, or a solid electrolyte using PEO, polypropylene oxide (PPO), polyethyleneimine (PEI), polyethylene sulfide (PES) or polyvinyl acetate (PVAc).

The matrix of the solid electrolyte is preferably formed using a polymer or a ceramic glass as the backbone. In the case of the typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may include a porous support or a cross-linked polymer to make up for the poor mechanical properties. The electrolyte layer of the present disclosure can serve as a separator, and thus an additional separator may be omitted.

The electrolyte layer 123 of the present disclosure may further include a lithium salt. The lithium salt can improve the ionic conductivity and response time. Here, non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The cable-type secondary battery of the present disclosure includes the cover member 110. Here, the cover member 110 is an insulator and is formed to surround the electrode assembly 120 bent into a substantially "S" shape and the second polarity current collector 130 so as to protect electrodes from moisture in the air and external impacts. The type of the cover member 110 is not particularly limited, but a sheet-like cover member may be preferably used. The cover member 110 may be made of a polymer resin such as, for example, PVC, HDPE or epoxy resin.

The cable-type secondary battery 100 with the cover member 110 has excellent flexibility and has a sheet shape, and thus the cable-type secondary battery 100 is suitable for the power supply of mobile devices in the form of a wrist watch.

Next, a method for manufacturing a cable-type secondary battery having the above-described structure will be briefly described.

A first polarity current collector in the form of a long and thin wire, whose cross-section perpendicular to the longitudinal direction is circular, asymmetrical oval, or polygonal, is prepared (step a).

At least two first polarity electrode active material layers are formed on an outer surface of the first polarity current collector to be spaced apart from each other at a predetermined interval in the longitudinal direction (step b).

The first polarity electrode active material layers may be formed by typical coating methods. For example, the first polarity electrode active material layers may be formed by an electroplating process or an anodic oxidation process. However, in order to maintain a predetermined interval, the first polarity electrode active material layers are preferably formed by discontinuously extrusion-coating an electrode slurry containing an active material using an extruder.

An electrolyte layer is formed to surround at least two first polarity electrode active material layers (step c).

The method for forming the electrolyte layer is not particularly limited, but an extrusion coating method is preferably used to facilitate the manufacturing process due to the nature of the linear cable-type secondary battery.

At least two second polarity electrode active material layers are formed on an outer surface of the electrolyte layer to be spaced apart from each other at a predetermined interval at positions corresponding to the first polarity electrode active material layers (step d).

An electrode assembly is formed by continuously bending the resulting product into a substantially "S" shape with respect to a space formed by the predetermined interval between the first polarity electrode active material layers (step e).

The electrode assembly is formed in a substantially "S" shape by bending an uncoated region of the electrode assembly in which the electrode active material layer is not formed.

At least one of both sides of the electrode assembly is surrounded by the second polarity current collector (step f).

The second polarity current collector is attached to both sides of the electrode assembly bent into a substantially "S" shape. The second polarity current collector may be selectively attached to one of both sides of the electrode assembly bent into a substantially "S" shape. The second polarity current collector is preferably in the form of a sheet.

The second polarity current collector and the electrode assembly are surrounded by a cover member, thus forming a cable-type secondary battery (step g).

The cover member is an insulator and is formed on the outermost surface to protect electrodes from moisture in the air and external impacts. The cover member may be made of a polymer resin such as, for example, PVC, HDPE or epoxy resin.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cable-type secondary battery comprising:
   an electrode assembly comprising
     a first polarity current collector,
     at least two first polarity electrode active material layers formed on an outer surface of the first polarity current collector and spaced apart from each other at a predetermined interval in a longitudinal direction of the first polarity current collector, each of the at least two first polarity electrode active material layers being located in a respective active region of the electrode assembly,
     an electrolyte layer filled to surround at least two first polarity electrode active material layers, and
     at least two second polarity electrode active material layers formed on an outer surface of the electrolyte layer and spaced apart from each other at a predetermined interval in the longitudinal direction, each of the at least two second polarity electrode active material layers being located in a respective one of the active regions of the electrode assembly at positions corresponding to the first polarity electrode active material layers,
   the electrode assembly being bent at one or more locations between the active regions of the electrode assembly such that the electrode assembly has a serpentine configuration;
   a second polarity current collector configured to surround at least one side of the electrode assembly which is bent into the serpentine configuration; and
   a cover member configured to surround the second polarity current collector and the electrode assembly in the serpentine configuration, the serpentine configuration of the electrode assembly being such that the active regions of the electrode assembly containing the first and second polarity active material layers are spaced apart from and not in contact with one another within the cover member.

2. The cable-type secondary battery of claim 1, wherein each of the first polarity electrode active material layers comprises one active material selected from the group consisting of: natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); a complex of the metal (Me) and carbon; and mixtures thereof.

3. The cable-type secondary battery of claim 1, wherein each of the second polarity electrode active material layers comprises one active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x < 0.5$, $0 \leq y < 0.5$, $0 \leq z < 0.5$, and $x+y+z \leq 1$), and mixtures thereof.

4. The cable-type secondary battery of claim 1, wherein the first polarity current collector comprises one selected from the group consisting of: stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; and a conductive polymer.

5. The cable-type secondary battery of claim 1, wherein the second polarity current collector comprises one selected from the group consisting of: stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; and a conductive polymer.

6. The cable-type secondary battery of claim 4 or 5, wherein the conductive polymer comprises at least one selected from the group consisting of polyacetylene, polyaniline, polypyrrole, polythiophene, polysulfurnitride, and mixtures thereof.

7. The cable-type secondary battery of claim 4 or 5, wherein the conductive material comprises at least one selected from the group consisting of polyacetylene, polyaniline, polypyrrole, polythiophene, polysulfurnitride, indium tin oxide (ITO), copper, silver, palladium, nickel, and mixtures thereof.

8. The cable-type secondary battery of claim 1, wherein the electrolyte layer comprises one selected from a group consisting of a gel-type polymer electrolyte using PEO, PVdF, PMMA, PAN or PVAC and a solid electrolyte using PEO, polypropylene oxide (PPO), polyethyleneimine (PEI), polyethylene sulfide (PES) or polyvinyl acetate (PVAc).

9. The cable-type secondary battery of claim 1, wherein the electrolyte layer further comprises a lithium salt.

10. The cable-type secondary battery of claim 9, wherein the lithium salt comprises at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

11. The cable-type secondary battery of claim 1, wherein the first polarity is a cathode and the second polarity is an anode.

12. A method for manufacturing a cable-type secondary battery, the method comprising:
    (a) providing a first polarity current collector;
    (b) forming at least two first polarity electrode active material layers on an outer surface of the first polarity current collector and spaced apart from each other at a predetermined interval in a longitudinal direction of the first polarity current collector, such that each of the at least two first polarity electrode active material layers are located in a respective active region;
    (c) forming an electrolyte layer to surround the at least two first polarity electrode active material layers;
    (d) forming at least two second polarity electrode active material layers on an outer surface of the electrolyte layer and spaced apart from each other at a predetermined interval in the longitudinal direction, such that each of the two second polarity electrode active material layers are located in a respective one of the active regions at positions corresponding to the first polarity electrode active material layers;
    (e) forming an electrode assembly by bending the resulting product at one or more locations between the active regions such that the electrode assembly has a serpentine configuration;
    (f) surrounding at least one side of the electrode assembly with a second polarity current collector; and
    (g) surrounding the second polarity current collector and the electrode assembly bent into the serpentine configuration with a cover member, the serpentine configuration being such that the active regions containing the first and second polarity active material layers are spaced apart from and not in contact with one another within the cover member.

13. A cable-type secondary battery comprising:
    an electrode assembly including:
        a first polarity current collector;
        a plurality of first regions disposed about the first polarity current collector and spaced apart from one another along a longitudinal direction of the first polarity current collector, each of the first regions including:
            (i) a first polarity electrode active material layer formed on an outer surface of the first polarity current collector;
            (ii) an electrolyte layer surrounding the first polarity electrode active material layer; and
            (iii) a second polarity electrode active material layer formed on an outer surface of the electrolyte layer; and
        a plurality of second regions alternating with the plurality of first regions along the longitudinal direction, the second regions containing none of the first and second polarity electrode active material layers therein;
    a second polarity current collector; and
    a cover member configured to surround the second polarity current collector and the electrode assembly in a serpentine configuration;
    wherein the serpentine configuration of the electrode assembly is such that each of the plurality of first regions is aligned with others of the plurality of first regions in a width dimension of the cover member but spaced apart from so as to not be in contact with others of the plurality of first regions in a length dimension of the cover member; and
    wherein, when the electrode assembly is in the serpentine configuration within the cover member, the second polarity current collector extends along the length dimension of the cover member so as to contact the serpentine electrode assembly on at least one side of the cover member in the width dimension.

* * * * *